United States Patent [19]

Evans

[11] Patent Number: 4,540,066
[45] Date of Patent: Sep. 10, 1985

[54] SELF-ADJUSTING PARKING BRAKE
[75] Inventor: Anthony C. Evans, Northville, Mich.
[73] Assignee: Kelsey-Hayes Company, Romulus, Mich.
[21] Appl. No.: 597,957
[22] Filed: Apr. 9, 1984
[51] Int. Cl.³ .............................................. F16D 65/56
[52] U.S. Cl. .................................. 188/71.9; 188/72.6; 188/196 BA
[58] Field of Search .................. 188/71.9, 72.6, 106 F, 188/196 BA; 192/111 A

[56] References Cited
U.S. PATENT DOCUMENTS 3,216,534 11/1965 Chouings et al. ........ 188/196 BA X
3,386,534  6/1968 Press ........................ 188/196 BA X

FOREIGN PATENT DOCUMENTS 253935   8/1964 Australia ............................ 188/71.9
1092686 11/1967 United Kingdom ............... 188/71.9

Primary Examiner—Duane A. Reger
Attorney, Agent, or Firm—Ralph J. Skinkiss

[57] ABSTRACT

A mechanical parking brake mechanism having a self adjusting feature to compensate for friction pad wear suitable for use with a hydraulic disc brake is disclosed. The embodiment disclosed teaches a parking brake mechanism separate and independent of the hydraulic brake actuating mechanism. Thus the parking brake mechanism may be combined with any disc brake as an add-on device for use on motor vehicles.

6 Claims, 9 Drawing Figures

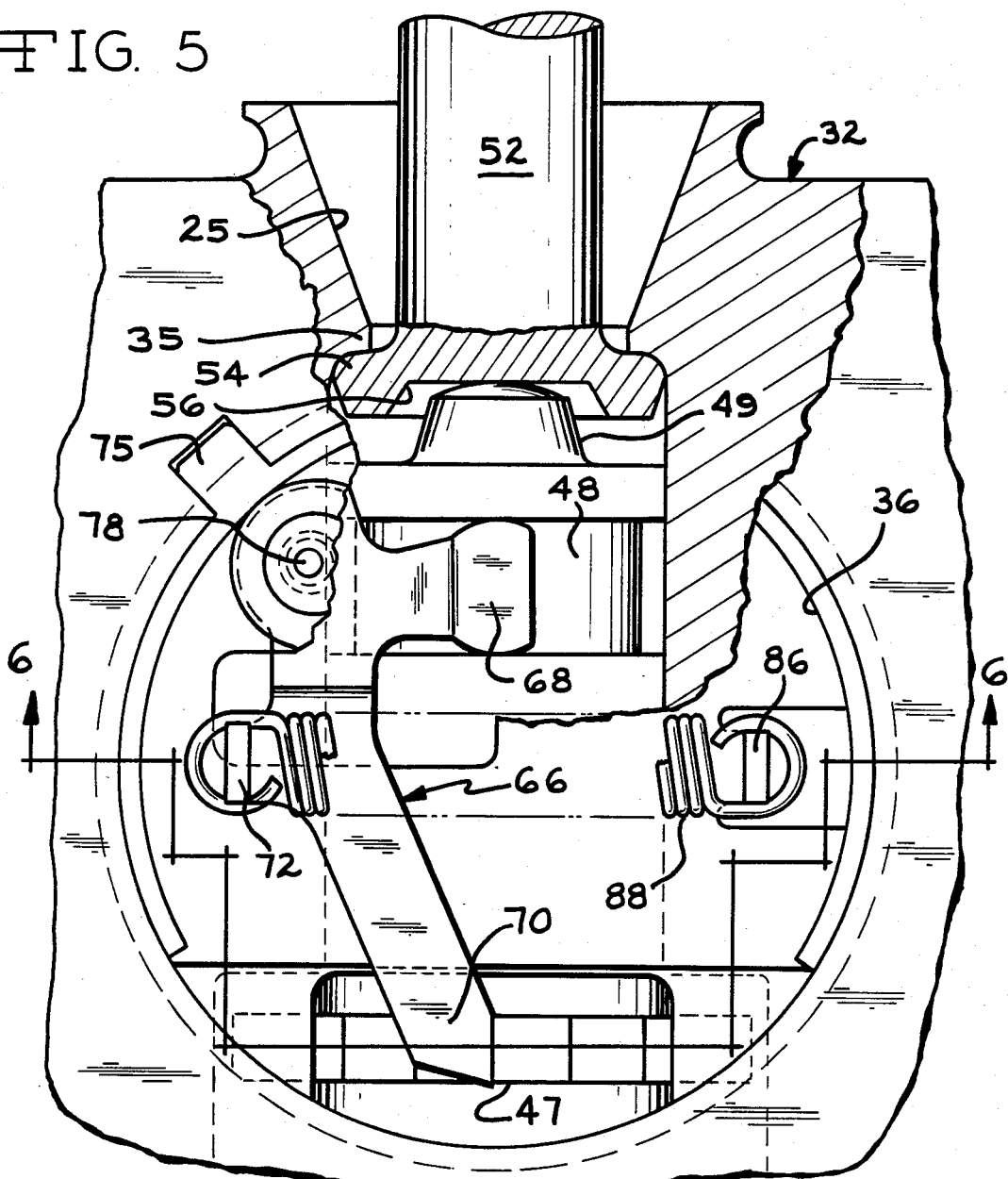

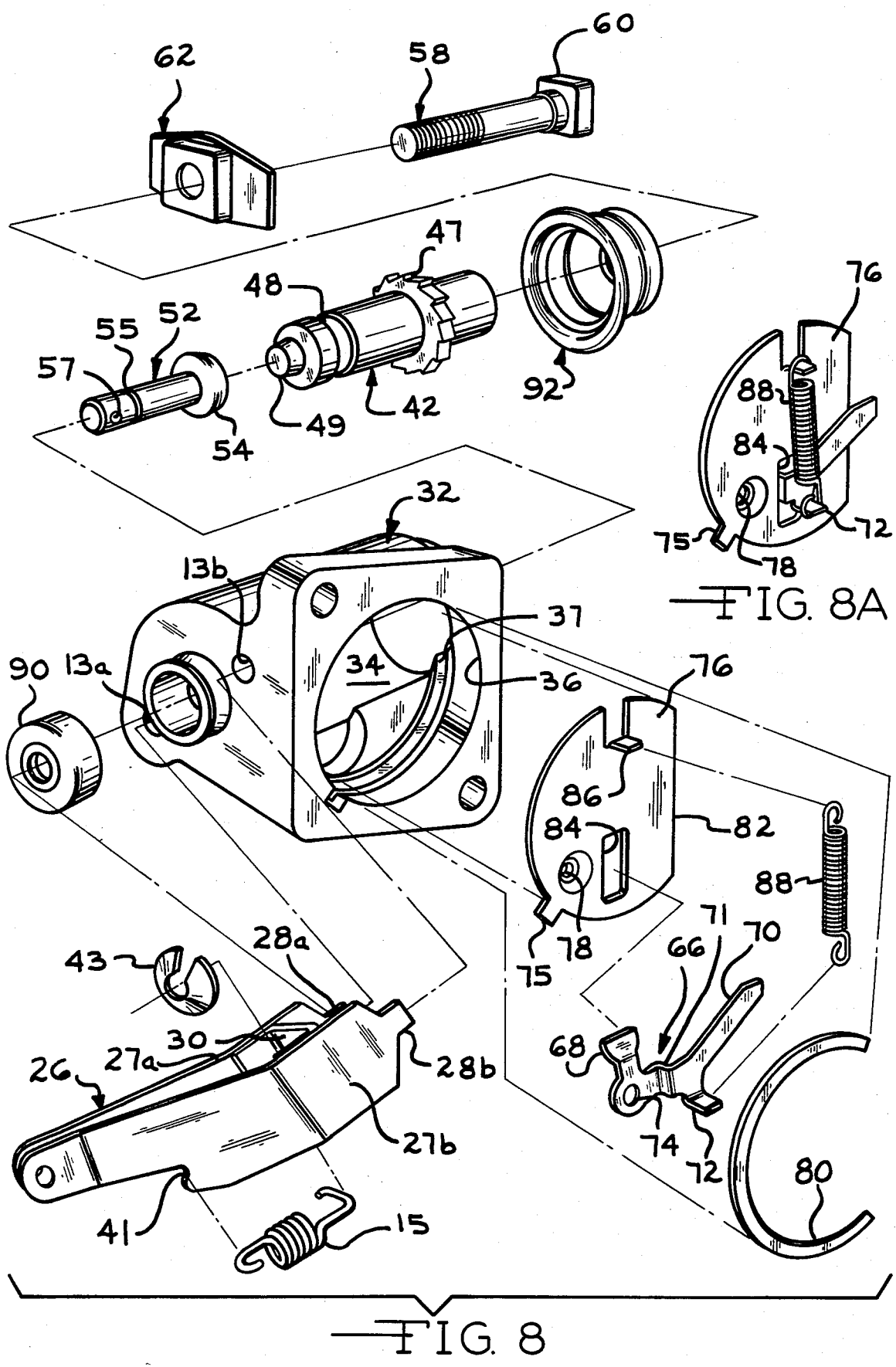

SELF-ADJUSTING PARKING BRAKE

BACKGROUND OF THE INVENTION

The present invention relates to an improved mechanical parking brake actuating assembly, having an integral self-adjusting feature, particularly suitable for use on rear axle disc brake assemblies.

The parking brake actuating assembly, as taught herein, is a "bolt-on" type assembly intended for external mounting to a disc brake caliper. Use of a "bolt-on" type assembly eliminates the necessity of having front and rear axle disc brake assemblies of different design since the parking brake mechanism is not an integral part of the disc brake assembly.

SUMMARY OF THE INVENTION

A preferred embodiment of "bolt-on" self-adjusting parking brake assembly comprises an adjustable thrust screw and adjusting nut combination mechanically activated by a toggle pin for parking brake application. The adjusting nut is acted upon by a ratchet-pawl arrangement each time the thrust screw and adjusting nut is activated. Activation of the thrust screw and adjusting nut combination occurs whenever the parking brake is mechanically activated or whenever the hydraulic brake is activated. Thus adjustment of the parking brake mechanism, for friction pad wear, is maintained regardless of the frequency of parking brake use.

DESCRIPTION OF THE DRAWINGS

FIG. 5 is a sectional view taken along line 5—5 in FIG. 4 showing the adjusting pawl mechanism in its idle position.

FIG. 6 is a sectional view taken along line 6—6 in FIG. 5.

FIG. 8 is an exploded pictorial of the "bolt-on" mechanical parking brake assembly.

FIG. 8a is a subassembly pictorial of the adjusting pawl mechanism.

DETAILED DESCRIPTION OF THE INVENTION

Assembly

Figure 1:
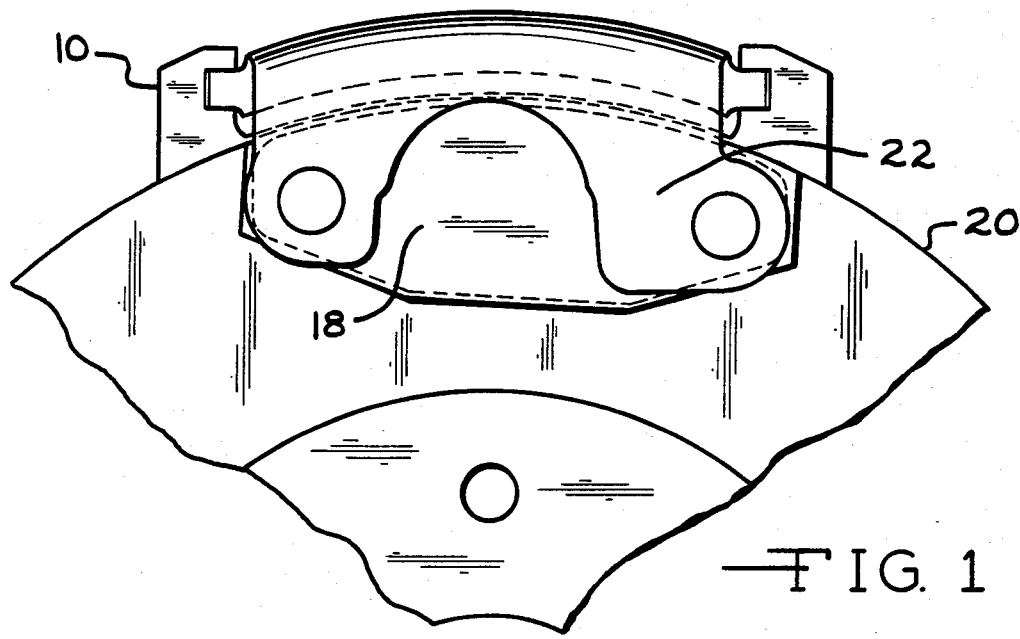
FIG. 1 is an outboard elevational view of a disc brake assembly suitable for use with my mechanical parking brake.

The embodiment described herein is preferably employed in conjunction with a disc brake assembly of a floating caliper design such as that shown in my U.S. Pat. No. 4,391,355. As shown in FIGS. 1 through 4 such a brake system generally comprises a C-shaped floating caliper 10 having an inboard leg 21 and outboard leg 22, each having affixed thereto brake pad assemblies 16 and 18 respectively. Within inboard leg 21 is cylinder bore 12 having its longitudinal axis generally perpendicular to the axis of the rotation of disc 20 and having brake activating piston 14 slidably disposed therein. In response to hydraulic activation of the brake, piston 14 exerts a force against inboard brake pad assembly 16 urging the pad into contact with disc 20. In reaction to the force exerted by pad 16 against rotor 20, caliper 10 translates upon pin 11 such that outboard caliper leg 22 urges brake pad assembly 18 into contact with the outboard face of rotor 20. As the activating hydraulic pressure increases within bore 12 the clamping force exerted by caliper 10 upon brake pad assemblies 16 and 18 increases thus resulting in increasing braking torques.

Figure 2:
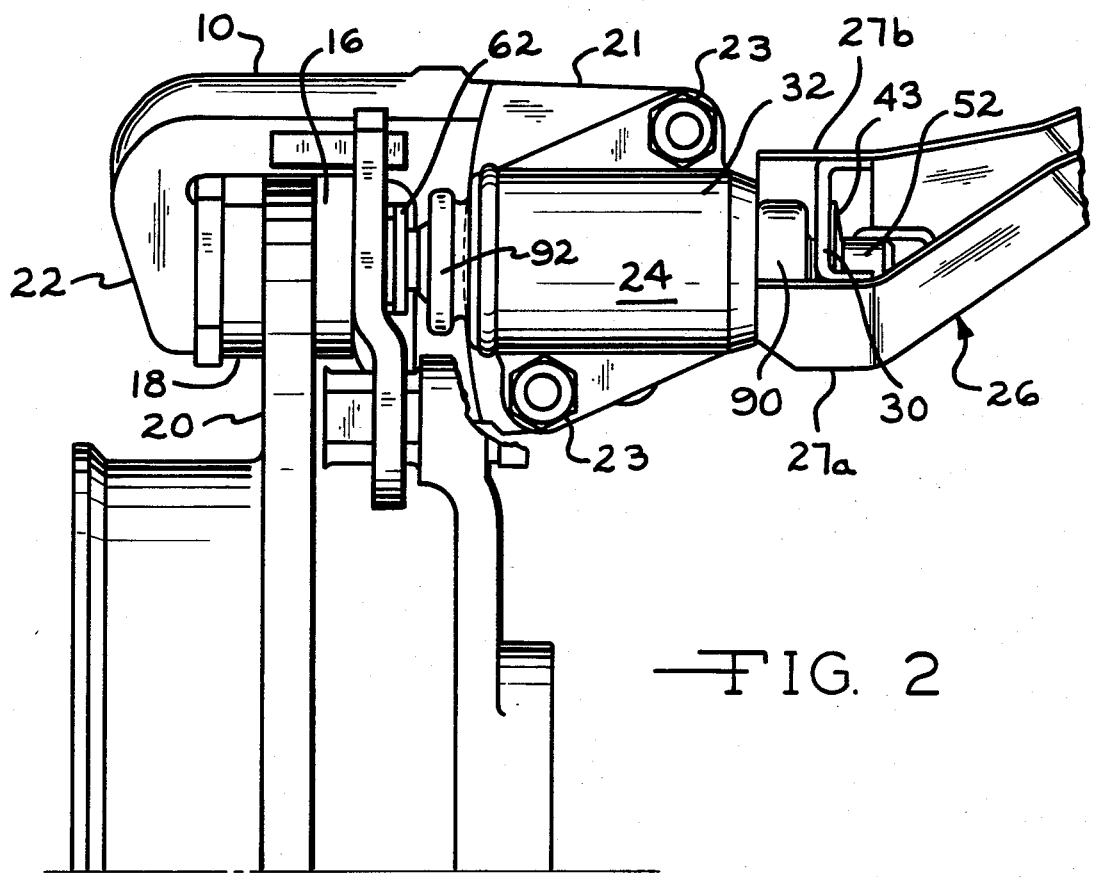
FIG. 2 is a side elevation of the floating caliper disc brake assembly as shown in FIG. 1 illustrating my "bolt-on" mechanical parking brake assembly as taught herein.
Figure 3:
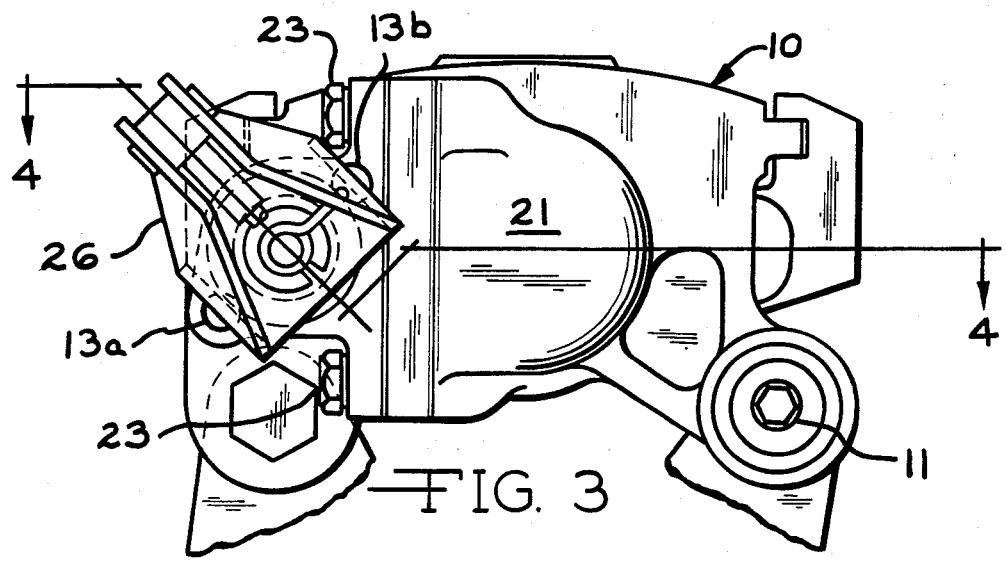
FIG. 3 is an inboard elevational view of the disc brake assembly shown in FIGS. 1 and 2.
Figure 4:
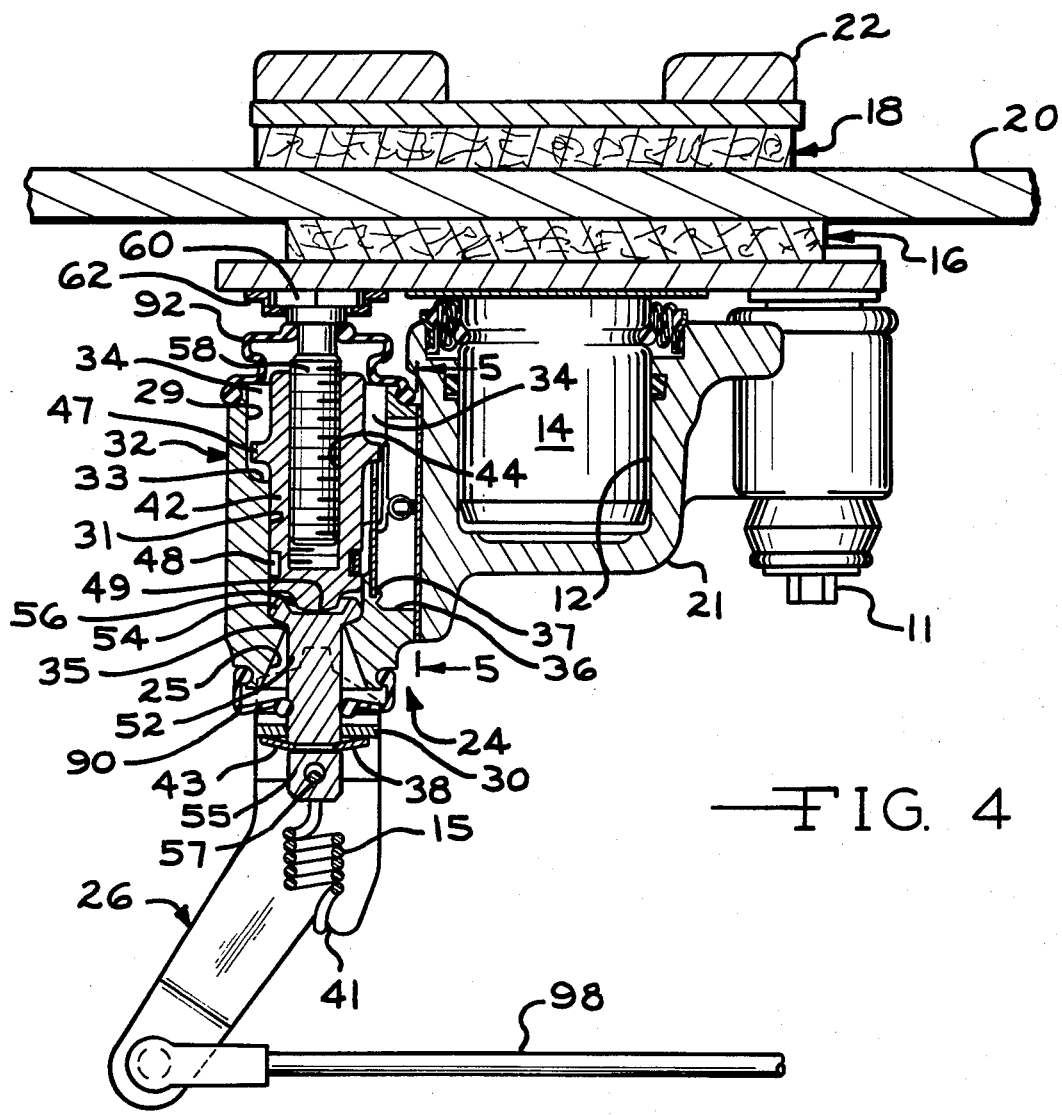
FIG. 4 is a sectional view taken along line 4—4 in FIG. 3 showing the operating elements of the mechanical parking brake actuating assembly.

With reference to FIGS. 2, 4, and 8, parking brake actuator and adjuster mechanism 24 is mounted to caliper 10 by suitable fastening means such as bolts 23 shown in FIG. 2. Housing 32 includes intersecting bores 34 and 36. The longitudinal axis of bore 34 is perpendicular to the plane of rotation of disc 20 and is configured to include a first diameter 29 extending from the inboard end of housing 32 and terminating at shoulder 33; a second diameter 31 extends from shoulder 33 to outboard shoulder 35. Extending from shoulder 35 and terminating at the outboard surface of housing 32 is conically shaped bore 25.

Positioned at the outboard end of bore 31 and extending through conical bore 25 is toggle pin 52 having its head 54 seated upon shoulder 35. Externally attached to toggle pin 52 is mechanical activating lever 26.

Activating lever 26 comprises side arms 27a and 27b spaced apart by web 30. The side arms include tangs 28a and 28b which are received in locator holes 13a and 13b respectively on housing 32. Web 30 is provided with opening 38 receiving therethrough the protruding toggle pin 52. Toggle pin 52 and activating lever 26 are fastened together by Belleville washer 43 received in groove 55 on pin 52 and coil spring 15 extending between eye 57 in pin 52 and notch 41 on lever 26. Dust boot 90 is provided to prevent entry of dirt into bore 25. By action of washer 43 and spring 15, tangs 28a and 28b are retained within locating holes 13a and 13b, and toggle pin head 54 is urged into seating employment with shoulder 35.

Extending through housing bore 34 and into matting engagement with bore 31 is adjusting nut 42 having a coaxial threaded bore 44 internally therein. Adjusting nut 42 communicates with toggle pin 52 by projection 49 on nut 42 extending into abutting engagement with recess 56 within toggle pin head 54.

Adjusting screw 58 threadingly engages threaded bore 44 in adjusting nut 42 and includes flared head 60 which is attachingly received within cage 62 attached to inboard brake pad assembly 16. Dust boot 92 is provided to prevent entry of dirt and contamination from entering bore 29 in housing 32.

Having described the parking brake activation elements the automatic adjusting elements will now be described.

Figure 7:
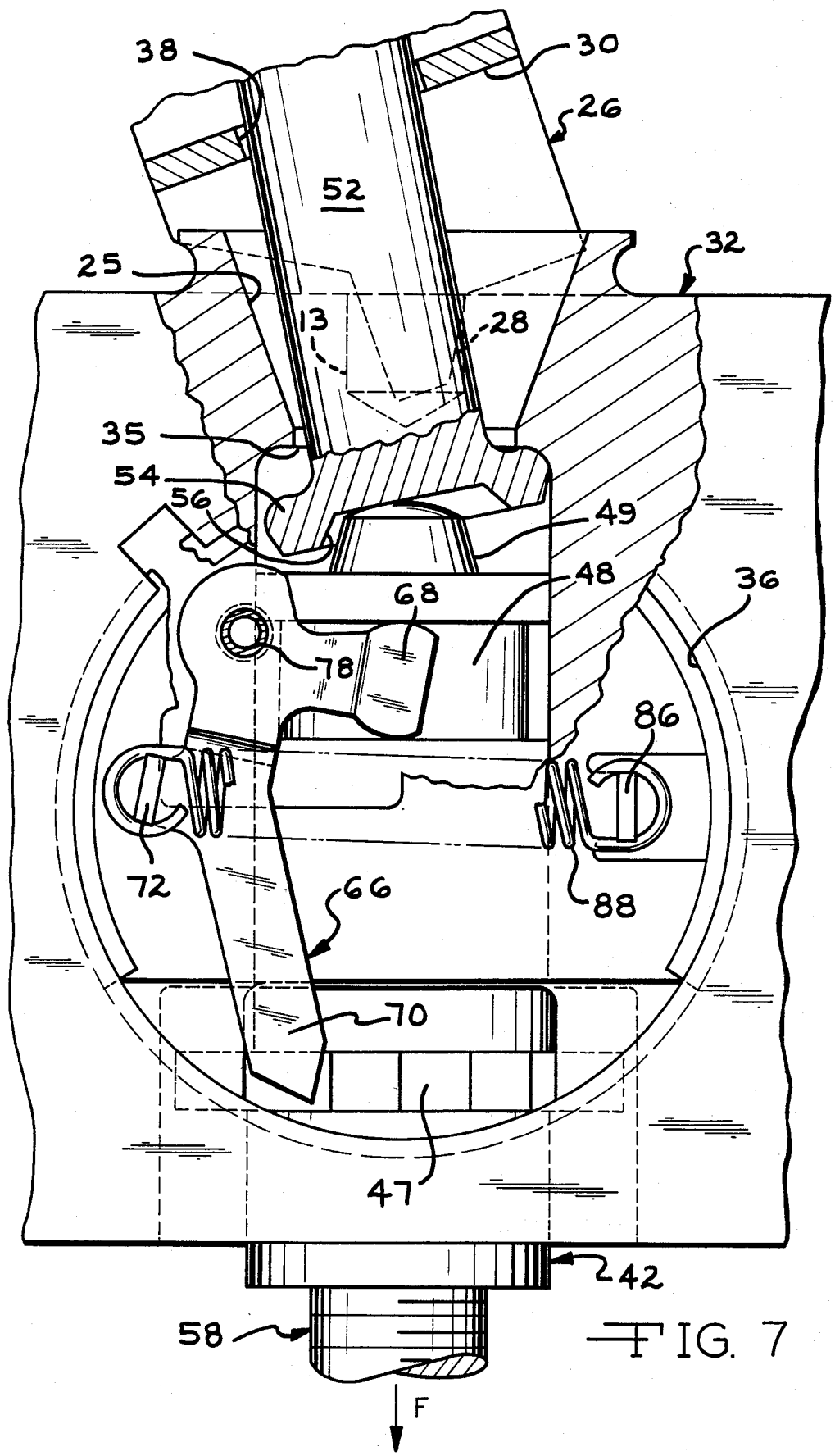
FIG. 7 is a sectional view, similar to FIG. 5 showing the adjusting pawl mechanism in its applied state.

Positioned within intersecting bore 36 in abutting engagement with shoulder 37 is the adjusting mechanism foundation plate 76. Plate 76 is provided with pivot post 78. Post 78 may be provided by upsetting plate metal, as shown, to form the post, by insertion of a roll pin or any other known technique. Adjustment pawl 66 is assembled on plate 76, as shown in FIG. 8a, such that pivot post 78 is received in pivot hole 74 with dog leg 71 of pawl 66 extending through aperture 84 of plate 66 thereby placing adjusting leg 70 and tracking arm 68 on opposite sides of plate 66 and generally parallel thereto. Spring 88 is attached to and extends between tang 86 on plate 76 and tang 72 on pawl 66 thereby biasing adjustment leg 70 in the counter clockwise direction. Plate 76 is axially retained in position by snap ring 80 and restrained from rotation by anti-rotation tang 75. When positioned within bore 36 plate 76 forms an opening bounded by side 82 of plate 76 and the wall of bore 36 through which ratchet teeth 47 protrude and engage leg 70 of pawl 66; tracking arm 68, in turn, slidingly engages trucking groove 48 on adjusting nut 42 as shown in FIGS. 4, 5, and 7.

Operation

My invention as disclosed herein has two operational functions. First, and foremost, the mechanism operates as a mechanical parking brake actuator. Secondly, the mechanism functions as a self-adjusting mechanism preventing loss of effectiveness of the parking brake through wear of the friction pads 16 and 17. The self-adjusting mechanism uniquely has two modes of operation; first and most importantly the self-adjusting mechanism operates to adjust for brake pad wear through normal hydraulic braking activation; secondly, the adjusting mechanism operates upon mechanical activation of the parking brake.

Mechanical actuation of the parking brake is initiated by the vehicle operator applying a tensioning force to cable 98 by means of a parking brake mechanical actuating mechanism not shown. A tensioning force in cable 98 causes actuator lever 26 to pivot about bores 13 by the receipt of tangs 28 therein. As lever 26 pivots it in turn causes a like pivoting of toggle pin 52 as shown in FIG. 7. The pivoting action of toggle pin 52 causes axial translation of adjuster nut 42 having adjuster screw 58 threadingly engaged therein applying a brake actuating force upon inboard brake pad assembly 16. Outboard brake pad assembly 18 is caused to frictionally engage disc 20 through the reactive force imparted to caliper 10. Upon release of the parking brake mechanism (not shown) by the vehicle operator, activating lever 26 and toggle pin 52 return to their normal idle position (as shown in FIG. 4) by action of return spring 15. Adjusting nut 42 in combination with screw 58 return to their idle position by action of spring 88.

During normal hydraulic activation of the disc brake, movement of the inboard brake pad assembly 16 causes a similar axial movement of the adjusting nut 42 and adjusting screw 58 assembly through the engagement and entrapment of screw head 60 within the bracket 62 affixed to the backing plate of inboard brake pad assembly 16. Any axial movement of adjusting nut 42 toward the disc 20 whether by actuation of the hydraulic brake or by the mechanical parking brake will set in motion the self adjusting mechanism and for a given axial displacement of adjusting nut 42, representing an amount of brake pad wear requiring adjustment, the adjusting pawl 66 affects rotation of adjusting nut 42 thereby advancing adjusting screw 58 a proportional amount as explained below.

Referring primarily to FIGS. 5, 6, and 7 it is seen that as the adjusting nut 42 is caused to translate toward the disc 20 leg 68 of adjuster pawl 66 tracking within groove 48 of adjuster nut 42 affects pivotal movement of pawl 66 about pivot 78. Compare FIG. 5 showing the mechanism in its non applied state and FIG. 7 showing the mechanism in the brake applied state. It should be appreciated that since FIG. 7 depicts mechanical activation of the mechanism, toggle pin 52 is shown in its tilted position; when adjusting nut 42 translates because of hydraulic brake activation toggle pin 52 remains in its idle position as shown in FIG. 5.

If the state of the brake pad assemblies 16 and 18 is such that a wear adjustment of the mechanical brake mechanism is desired, as manifested in a predetermined amount of adjustar screw translation, pawl rachet leg 70 is caused to advance upon adjuster screw rachet wheel 47 engaging the next available tooth as seen again by comparing FIGS. 5 and 7.

Upon release of the brake applying mechanism (either the parking brake or hydraulic brake) the energy stored in spring 88, during brake application, acts to restore not only pawl 66 to its original position thereby rotating adjuster nut 42 causing a proportional advance of adjuster screw 58 but through action of pawl leg 68 upon adjuster screw groove 48 the adjuster screw 42 is caused to return to its idle position as shown in FIGS. 2 and 5.

While the above description constitutes the preferred embodiment of the invention, it will be appreciated that the invention is susceptible to modification, variation and change without departing from the scope or fair meaning of the accompanying claims.

I claim:

1. An automatically adjusting parking brake actuating mechanism for use with an automotive brake assembly comprising:

thrust screw means attached to the friction pad means whereby said thrust screw axially translates in response to normal brake activating movement of said friction pad means;

adjusting nut means having an axial threaded bore threadingly receiving therein said thrust screw, said adjusting nut means including coaxial ratchet teeth and a peripheral groove externally circumscribing said adjusting nut means;

adjuster pawl means having a pivot, relative to said adjusting nut means, and including an adjusting leg communicating with said ratchet teeth and a camming leg communicating with said peripheral groove whereby axial translation of said adjusting nut means affects pivotal movement of said adjuster pawl means thereby causing rotation of said ratchet teeth and said adjusting nut means relative to said thrust screw means;

means for applying an axial force upon said adjusting nut means thereby affecting axial translation of said adjusting nut means in combination with said thrust screw means to urge said friction pad means into a brake applying mode.

2. The mechanical parking brake actuating mechanism as claimed in claim 1 wherein said means for applying an axial force upon said adjusting nut means comprises toggle pin means communicating with said adjusting nut means whereby pivotal movement of said toggle pin means applies said axial force upon said adjusting nut means.

3. In combination with an automotive hydraulically-activated disc brake an automatically adjusting parking brake mechanism comprising:

a housing juxtaposed to said disc brake assembly, said housing having an elongate bore extending through said housing;

a parking brake adjusting strut assembly including an elongate adjusting nut having a threaded bore therein and a thrust screw threadingly received within said threaded bore, said adjusting nut having a circumscribing ratchet wheel and peripheral groove axially separated one from the other, said strut assembly slidingly retained within said housing bore whereby said thrust screw extends from a first open end of said housing bore;

means for attaching said thrust screw to one friction pad assembly of said disc brake whereby said adjusting strut assembly is caused to translate within said elongate bore and in concert with said friction pad assembly;

pawl means movingly affixed to said housing, said pawl means including, an adjusting leg communicating with said ratchet wheel and a camming leg communicating with said peripheral groove circumscribing said adjusting nut whereby translation of said adjuster strut assembly through a predetermined distance causes said pawl means adjusting leg to rotate said ratchet wheel thereby advancing said adjuster screw outwardly from said adjusting nut threaded bore thereby increasing the axial length of the adjusting strut assembly;

means for applying an axial force upon said adjusting strut assembly thereby activating said disc brake.

4. The automatically adjusting parking brake mechanism as claimed in claim 3 wherein said means for applying an axial force upon said adjusting strut assembly comprises toggle pin means in communication with said adjusting strut assembly whereby pivotal movement of said toggle pin means applies said axial force upon said adjusting strut assembly.

5. Automatic brake adjusting apparatus comprising:

an adjusting strut assembly including adjusting nut means having a threaded bore therein and thrust screw means threadingly received within said threaded bore, said adjusting nut means having a circumscribing ratchet wheel and a peripheral groove axially separated one from the other;

means for attaching said adjusting strut assembly to friction pad means of a brake assembly whereby said adjusting strut assembly is caused to move in concert with said friction pad means;

pawl means including a first arm communicating with said ratchet wheel, a second arm communicating with said peripheral groove and having a pivot therebetween whereby upon a predetermined axial translation of said adjusting strut assembly said adjusting strut assembly causes rotational movement of said pawl arms about said pivot sufficient to rotate said ratchet wheel and said adjusting nut means relative to said thrust screw means thereby changing the axial length of said adjusting strut assembly.

6. Automatic brake adjusting apparatus comprising:

an adjusting strut assembly including adjusting nut means having a threaded bore therein and thrust screw means threadingly received within said threaded bore, said adjusting nut means having a circumscribing ratchet wheel and a peripheral groove axially separated one from the other;

means for attaching said adjusting strut assembly to friction pad means of a brake assembly whereby said adjusting strut assembly is caused to move in concert with said friction pad means;

pawl means including a first arm communicating with said ratchet wheel, a second arm communicating with said peripheral groove and having a pivot therebetween whereby upon a predetermined relative movement between said pivot and said adjusting nut means said first pawl arm is caused to rotate about said pivot sufficiently to rotate said ratchet wheel and said adjusting nut means relative to said thrust screw means thereby changing the axial length of said adjusting strut assembly.

* * * * *